Aug. 31, 1965   R. A. A. JEANNIN   3,203,831
PROCESS AND APPARATUS FOR COATING AND SINTERING
OF STRIP MATERIAL FOR ELECTRODES
Filed Nov. 21, 1961   4 Sheets-Sheet 2

INVENTOR
ROBERT ACHILLE ANTOINE JEANNIN
BY
Kenyon & Kenyon
ATTORNEYS

United States Patent Office 3,203,831
Patented Aug. 31, 1965

3,203,831
PROCESS AND APPARATUS FOR COATING AND SINTERING OF STRIP MATERIAL FOR ELECTRODES
Robert Achille Antoine Jeannin, Paris, France, assignor to Societe des Accumulateurs Fixes et de Traction (Societe Anonyme), Romainville, France, a company of France
Filed Nov. 21, 1961, Ser. No. 153,927
Claims priority, application France, Nov. 23, 1960, 844,770; Sept. 27, 1960, 839,632
7 Claims. (Cl. 117—230)

This invention relates to coating and sintering processes and apparatus for the manufacture of electrodes.

The processes customarily used for the sintering of metal-powder-(nickel, iron, copper, etc.) coated strips of foil or metal gauze consist in having said strips travel at suitable speeds through narrow muffle furnaces that are electrically heated and filled with inert or, preferably, reducing gases.

These processes present various disadvantages, in particular:

(1) The electric power consumed for heating the muffles is very high;

(2) Muffle furnaces made of refractory materials are rapidly damaged by the corrosive action of the products used in the composition of the adhesives that usually contain alkaline ashes;

(3) The inertia of heat-insulated muffles in the refractory stonework is substantial and, owing to this fact, an automatic, immediate adjustment of the sintering temperature is not possible;

(4) The heat transmission, taking place by radiation and convection, depends on the geometric position of the carrier strip with respect to the radiating surfaces. It is consequently advantageous that the moving strip should maintain a position along the axis of the furnace, which is a delicate operation;

(5) It is difficult to make a correct setting of the sintering temperature since there is a very sharp temperature gradient within a limited space.

The present invention makes it possible to eliminate the above-mentioned disadvantages and in one aspect relates to a process essentially consisting in treating as an electrical resistance the strip coated with a metal powder (admixed with a suitable adhesive) and then dried, and in having a current of sufficient intensity pass through it in order to bring it up to the adequate sintering temperature for the period required, with the said strip passing in an inert or reducing atmosphere.

The main advantage of this aspect of the process resides in the fact that the heat necessary for achieving the suitable sintering temperature is generated within the very body of the material that is to be sintered and that, owing to this fact, the energy expended is fully used for the heating of this material.

Another substantial advantage of this aspect of the process is the fact that it permits without difficulty the quasi-instantaneous control of the sintering temperature by virtue of the very reduced heat inertia of the strip to be sintered and its rapid reaction to all desired variations of the electric power fed into the strip for being transformed therein into thermal energy.

Also, an object of the present invention is a device for the application of the process set forth above.

According to one of the characteristics of this device, the current is fed to the strip to be sintered by the generator contact rollers situated perpendicular to the running direction of the strip, these rollers being, if necessary, cooled by the internal circulation of water or any other suitable liquid.

According to another characteristic of this device that could besides exist conjointly with the preceding one the sintering operation by means of an electric curren applied to the strip is carried out within a downwardl opened bell containing a light, protective gas, for in stance, hydrogen, that is preferably introduced with certain overpressure so as to guarantee the permanentl filled condition of the bell. To dissipate the heat liber ated by the passage of the electric current, the walls o this bell are to be appropriately cooled, for instance, b means of a cooling coil lining said bell.

In an alternative and improved process and apparatus the coated strip is made to travel in vertical direction an to pass over an upper reversing pulley having a horizon tal axis so as to offer an ascending and a descending bel side and the sintering operation is carried out along section of the said descending side, that is to say, belo the pulley, according to the travelling direction of th strip. As to the ascending side, it can advantageousl be subjected to a drying operation after coating with pasty layer as will be described.

The apparatus constructed in this manner is very com pact and requires little space. But, in addition to thi substantial advantage, the fact that the strip is bein dried along the ascending side and sintered along th descending side offers a great advantage if one take into consideration that the strip, prior to drying, has substantial weight owing to the amount of water it con tains. With known arrangements where the sintering fui nace is situated above the section in the process of dry ing, the section of the strip undergoing sintering is sub jected to stretching as a result of the heavy weight of th strip preceding it, thus causing permanent deformatior On the contrary, within the framework of the present in vention, the weight borne by this section is much lighte1 not only because the descending side is shorter, but als because the strip is dry and consequently much lighte1

According to another improvement of this embodi ment that may exist independently, or conjointly witl the preceding one just described, the sintering operatio1 occurs within a muffle or a similar enclosure througl which the strip is passing, and which fulfills the doubl duty of constituting a heat reflector and of maintaining slightly reducing inert atmosphere. Said muffle is prefer ably designed of a light material that is as refractory a possible, e.g. diatomite base insulating bricks pierced b holes according to their vertical dimensions and held il place by means of threaded tightening braces into whicl they are inserted, with a light binding agent providin tightness at the joints.

Contrary to the bell first described as regards the firs embodiment where the reducing gas is supplied fron above, the muffle of this embodiment is supplied fron below with a gas under overpressure whose discharge i greater than the leakage created at the entry zone of th dried strip in the muffle. Particularly satisfactory result were achieved with a gas constituted by nitrogen con taining 10% of hydrogen.

According to one mode of construction of this embodi ment, the sintering muffle is extended by a cooling jacke which may merely consist of a rectangular sheet meta shell of narrow cross-section on which a pipe, preferabl of metal, is wound which is traversed by a current o cold water.

This embodiment also includes an improved arrange ment of the contact means that apply the sintering curren to the strip.

According to this embodiment, electric contact is pro vided by means of conductive cylinders arranged by pairs for each current feed terminal in such a way tha they impart to the strip to be sintered opposite changes in direction likely to improve the contact of the strip over the said cylinders.

One of the continuous manufacturing processes for thin electrodes consists in coating an either perforated or non-perforated nickel-plated steel or nickel foil strip having a thickness between, e.g., 5/100 and 19/1000 of a millimeter—or even a metal gauze of the same thickness and in which the dimensions of the mesh are in the order of a millimeter—with a suspension in water of nickel powder manufactured preferably from nickel carbonyl admixed with a small amount of an adhesive or thickener. Such a suspension generally contains 50% of its weight in water and this water must be removed.

The drying operation by means of the continuous process of these strips prior to the sintering of the nickel powder is delicate and provides drawbacks resulting in waste that increases their cost price.

Vertical driers that use infra-red light-emitting lamps are very costly and their output is of the poorest. In addition, the lamps are fragile and even slight projections of nickel plate can cause them to burst.

Finally, the precise temperature control of such driers is difficult if not impracticable.

The use of driers equipped with ribbed resistances having dark radiation and controlled by autotransformers appears to be better, much sturdier and easier to adjust. Nevertheless, their output remains also low for, as in the case of the aforementioned infra-red type driers, the thermal energy transmitted by radiation and convection to the moving strip generates water-vapor saturated air layers which follow the strip in its rising movement, slowing down its drying, and then escape into the atmosphere.

The ventilation of the driers in opposite direction to the hot air flow is nothing but a palliative that cools down the strip and wastes the thermal units it receives from the heating elements through radiation and convection.

The present invention makes it possible to remedy all of the above defects and difficulties and provides a remarkably simple solution to the drying operation of the coated support strip by not requiring the use of a drier properly speaking.

It consists in using the strip itself during drying of the paste as a heating resistance by circulating therein under low voltage a high-intensity electric current.

In this way, the heat is generated *in situ* with a very high heat efficiency while producing besides a transmission of heat that is immediate and without inertia, which makes it possible to provide accurate temperature control.

The use as resistance of the metallic support strip, preferably a perforated metal foil, is perfectly acceptable, for the dimensional characteristics required for such materials designed for the manufacture of thin plates are extremely strict both with regard to their thicknesses and their widths and their perforation dimensions, as well as with regard to the nature of the material forming the support strip.

Consequently, the resistance at linear measurement of the latter is practically constant and one can be certain, for a given feed voltage, to have always the same intensity flow through the foil and thus to produce always the same amount of thermal units.

With regard to the electric properties of the nickel powder paste in suspension in the water, it was found that those pastes having a very resistant material were the ones in which no appreciable current would circulate at a few volts, at all events as long as a small amount of water remained between the elementary grains of the powder. However, when the said paste is completely dry, its electrical resistance becomes extremely weak and it reacts pretty much like a sheet of metallic nickel having practically the same weight and the same apparent surface.

But since the question involved is the application of an electric heating current to a strip coated with pasty insulating layers, a difficulty is encountered in the current feed in the sense that it is necessary to get to the metallic core.

According to the present invention, use is made to this end of a conductive cylinder having an axis perpendicular to the running direction of the strip and provided with protruding ribs of an elevation sufficient to come directly in touch with the metallic support strip either through the pasty layer or laterally with respect to the latter.

It is advantageous to make use of two similar cylinders situated on either side of the coated strip and urged toward it by any appropriate means. Such a set of two ribbed cylinders is disclosed by applicant in his copending patent application, Serial No. 140,796, filed September 26, 1961, for a "Device for Adjusting the Thickness of Paste Layers and Use of Same for Manufacturing Sintered Electrodes," with regard to a different problem, i.e., the exact control of the thickness of coating layers. It is besides possible advantageously to combine, in accordance with the present invention, this thickness control means with the current feed by making use of these same ribbed cylinders for carrying out of the two functions.

Consequently, the ribbed cylinder or cylinders constitute, according to the present invention, one of the terminals for the current feed to the metallic core for the drying by joulean effect of the pasty coatings of the latter, the other terminal may be formed simply by a roller or a smooth drum over which is passing the strip, already dried or having reached an advanced stage of dryness, said roller or smooth drum being arranged to come in contact with the dry coating which, as noted above, is conductive, contrary to the wet coating.

Other objects, features and aspects of this invention will become apparent from the following specification and the accompanying drawings, wherein:

FIGURE 7 is a further schematic variant of FIGURE 4.

Figure 1:
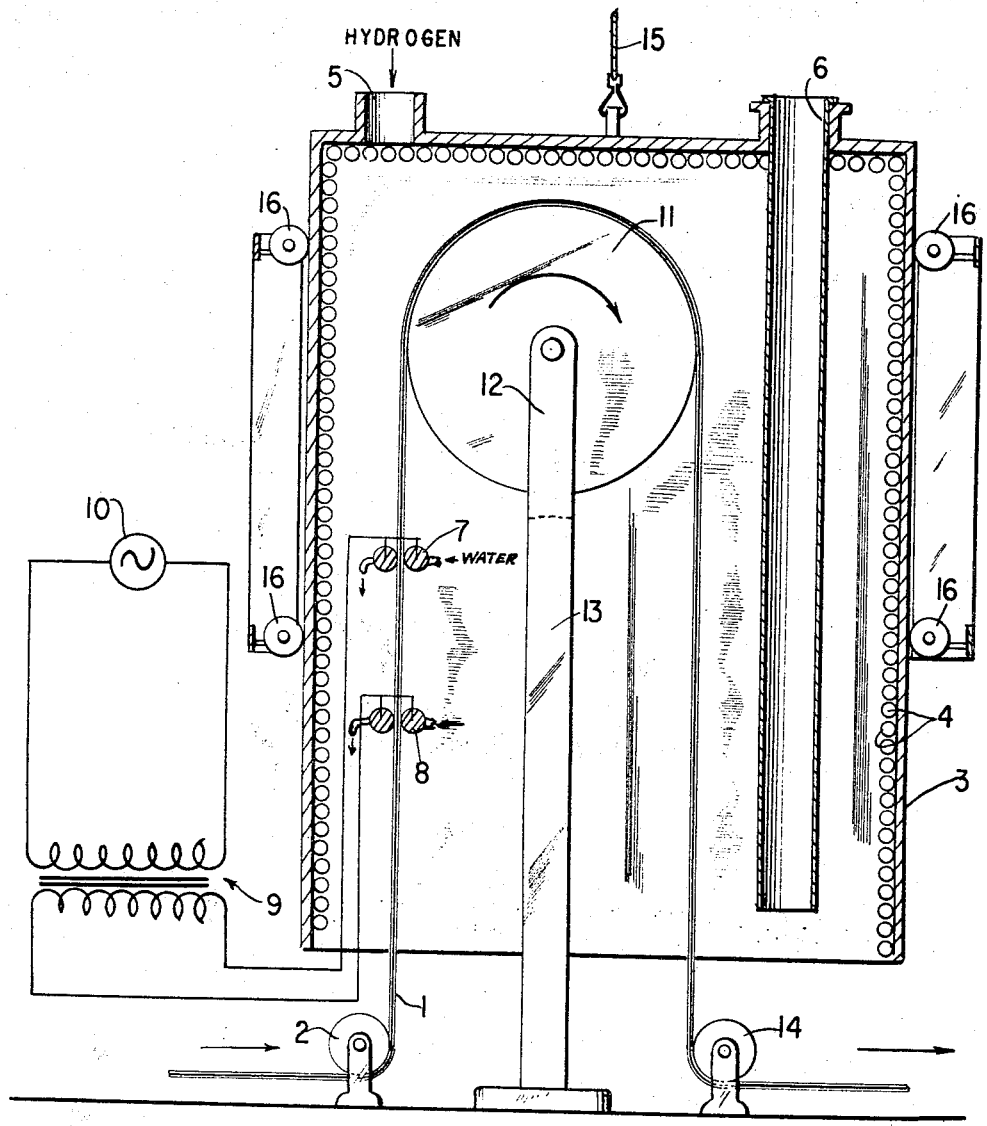
FIGURE 1 is a schematic view in partial cross section of an apparatus intended to carry out the sintering process of this invention.

Referring to the drawings and first to FIGURE 1, the reference character 1 refers to a strip comprised, for instance, of a perforated or non-perforated nickel or copper or nickel-plated steel foil coated on at least one of its surfaces with a metal compound in powder form, preferably derived from nickel carbonyl, held in place by a small amount of an adhesive such as carboxymethyl cellulose. The coating may be effected as will be described hereinafter.

This strip, following coating and drying, passes under a reversing roller 2 to enter in a downwardly opened bell 3 whose walls are lined with a cooling coil 4. A supply duct 5 for hydrogen (or any other light reducing or neutral gas that is suitable) opens into the upper section of the bell while an overflow pipe 6 dips into said bell into proximity with its lower opening.

Inside this bell, two spaced-apart pairs of electric current supplying rollers 7 and 8 that are perpendicular to the running direction of the strip 1 are provided. The strip 1 passes between the pairs of rollers and the latter press against the strip and constitute the current feed terminals. For improving contact, it is suggested to subject the surfaces of these rollers 7 and 8 beforehand to a sandblasting treatment designed to provide their surfaces with a certain roughness. The respective pairs of rollers 7 and 8 are connected to the secondary of a step-down transformer 9 supplied by the electric power source 10.

Above these pairs of rollers 7 and 8, the strip 1 passes around a drum 11 situated in the upper section of the bell and borne by a fork-joint 12 on the top of a column 13. The strip 1 then descends again toward the exit of the bell and, following passage around a reversing roller 14, is wound up on a reel (not shown).

The bell 3 can be raised by actuating a cable 15 to which it is connected, its movement being guided by slides or live rollers 16.

The arrangement and device just described are used as follows:

With the bell 3 in raised condition, the strip to be sintered 1 is inserted between the pairs of contact rollers 7 and 8, is then passed over the drum 11 and under the reversing roller 14 to connect it finally to the wind-up reel (not shown) which may be revolvingly driven to provide for the advance of the strip at constant speed.

With the strip 1 then in this threaded position, the bell 3 is lowered and hydrogen or other protective gas at a slight overpressure is supplied through the duct 5. This gas gradually fills the bell starting from the top down and drives back the air it contained and, following complete filling, escapes through the overflow pipe 6 at whose outlet it may be collected and recycled. It is recommended that this supply of hydrogen under overpressure be maintained uninterruptedly so as to be quite certain that the bell 3 is always filled with this gas. Indeed, an accidental, even partial, drainage could produce serious consequences involving the destruction of the strip 1: it is known that the sintering treatment is carried out at a temperature in the order of 900 to 1000° while nickel oxidizes in air at approximately 400° and even at lower temperatures, thus entailing the necessity of operating in an inert or protective, or, better still, reducing atmosphere.

The sintering treatment, properly speaking, occurs in the section of the strip 1 situated between the pairs of contact rollers 7 and 8 when the electric current is applied to them. The intensity of the current passing through the strip is determined by the feed voltage as well as by the distance that separates the pairs of rollers 7 and 8, and these two parameters can be suitably adjusted. Likewise, the sintering period depends on the same distance as well as on the speed of advance of the strip 1. As an indication, very satisfactory results were achieved by using a transformer 9 lowering the voltage from 110 to 10 v. and providing a current from 150 to 200 a., for a distance of 60 to 50 mm. between the pairs of rollers 7 and 8, the duration of sintering being approximately 1 minute, this being the case with a strip having a width of 60 mm. and a thickness of 0.6 mm.

To avoid excessive heating of the rollers 7 and 8, cooling thereof as by means of internal circulation of water in any desirable way can be provided.

Dissipation of the sintering heat generated in the strip 1 by the passage of the electric current therethrough is produced by means of the cooling coil in the inner face of bell 3. One must, of course, see to it that this cooling be adequate so that the temperature of the strip 1 at the bell exit be below 400°, temperature at which the nickel oxidizes in the air as indicated above; as far as the hydrogen is concerned, its temperature at the lower section of the bell, that is to say, in the region of contact with the ambient air, must not exceed 100°, for at these temperatures, hydrogen, forming an explosive mixture with the air with which it is in contact at the bottom of the bell, is likely to ignite.

It is besides possible to reduce the heat radiated by the strip 1 subjected to sintering by providing a sheath of refractory material around the rollers 7 and 8 and the section of the strip situated between them.

It is understood that changes can be made in the mode of construction just described, more particularly through substitution of equivalent technical means, without departing thereby from the framework of the present invention. More particularly, it is quite obvious that the current supply rollers 7 and 8 could be replaced by other suitable means, for instance, by sliding contacts.

Figure 2:
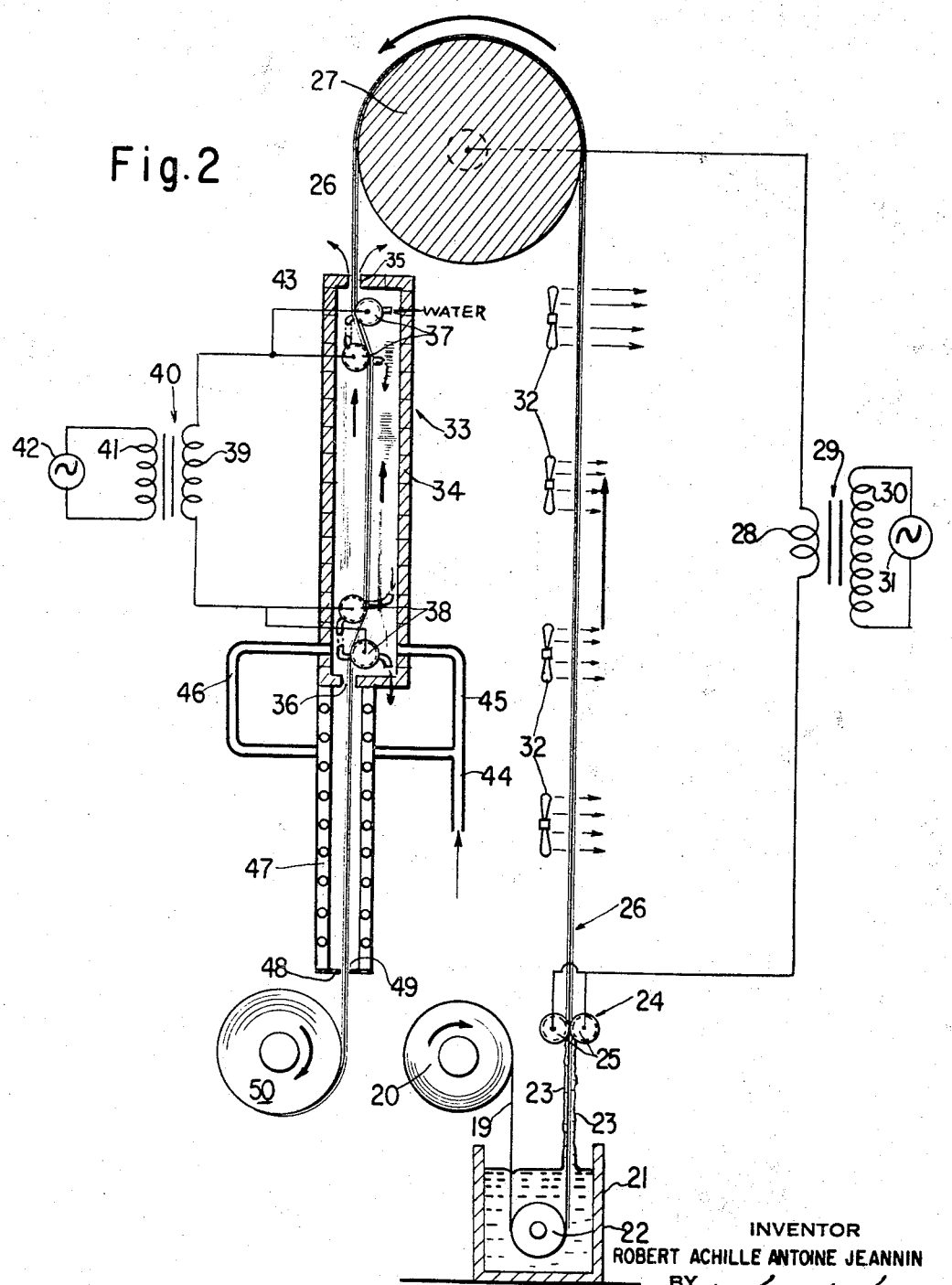
FIGURE 2 is a schematic vertical cross-sectionalized view of a modified apparatus intended to carry out the coating and sintering process of this invention.
Figure 4:
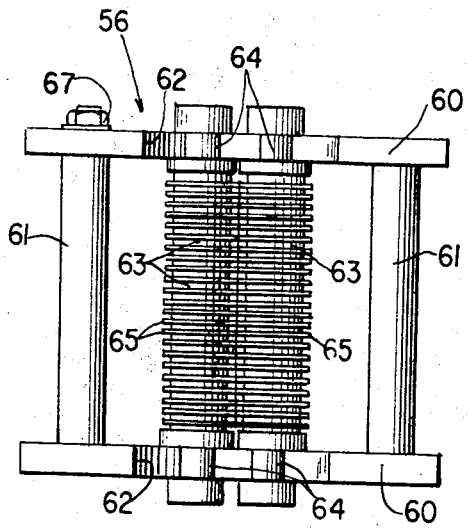
FIGURE 4 is a plan view on a larger scale of a detail of the apparatus of FIGURE 3.
Figure 5:
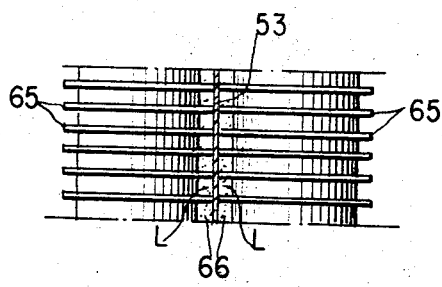
FIGURE 5 is a partial plan view of the detail of FIGURE 4.

In the embodiment shown in FIGURE 2 of the drawing the bare metal foil 19 supplied by a feed reel 20 passes into a vessel 21 around a roller 22 therein. The vessel contains the coating product and the foil 19 coated on its faces with layers 23 of the coating product then traverse a device 24 for equalizing of the thicknesses of the past layers 23. This device 24 is advantageously constituted of two ribbed cylinders 25 of the type disclosed in m said co-pending application, Serial No. 140,796 and also as described hereinbelow in connection with FIGURES 4, 5 and 6. This device 24 regulates the uniformity and thickness of the coating layers 23.

The coated strip 26, after leaving the layer equalizing device 24, passes over a reversing pulley or a driving drum 27 situated in an elevated position so that this strip 26 presents a vertically ascending strip portion and a descending strip portion.

The ascending portion of strip 26 is subjected to a drying treatment to dry coating layers 23 thereon by joulean effect. To this end, the ascending portion of strip 26 and particularly the foil 19 thereof is traversed by a current supplied by the secondary 28 of a transformer 29 whose primary 30 is supplied by a suitable power source 30. The terminals of secondary 28 are connected to the ribbed cylinders 25 and to drum 27 so that the current from secondary 28 is applied to the ascending portion of strip 26 by means of the ribbed cylinders 25 on the one hand and the drum 27 on the other, thus heating foil 19 and drying layers 23 thereon. Ventilation provided by suitable means such as blowers or fans 32 which accelerate elimination of water vaporized on the surface level of the ascending portion of coated strip 26 as a result of its electrical heating as described. Drying of the coatings is completed on the ascending portion of strip 26 by said heating.

In accordance with this embodiment of the present invention, the sintering operation takes place along the descending portion of the dried coated strip 26, right after it leaves the drum 27. It occurs in a muffle 33 comprising refractory bricks 34. This muffle 33 is disposed substantially vertically and the dried descending portion of dried strip 26 passes therethrough entering its top through a narrow slot 25 and emerging at its bottom through a narrow slot 36. The muffle 33 on its inside has respective pairs of fixed contact cylinders 37 and 38, for example, of copper. These pairs of cylinders 37 and 38 are connected to the terminals of the secondary 39 of a transformer 40 whose primary 41 is connected to a power source 42 so that the current discharged by the secondary consequently passes through the descending portion of the strip 26 within muffle 33 situated between the two pairs of contact cylinders 37 and 38 and brings this section up to the required sintering temperature.

It should be noted that each one of the current feed terminals of secondary 39 is divided into two parallel-connected tappings that supply the current to the pairs of the cylinders 37 and 38. The latter are not arranged tangentially to the vertical plane of the strip 26 but each pair is actually spaced somewhat closer together in superposed relationship as is clearly indicated in FIGURE 2 of the drawing. Consequently, the descending portion of the strip, instead of touching each cylinder pair at a single line of tangency, is bent at each pair of the cylinders 37 and 38 into a very open S-shape by a double bend in opposite directions, the respective sections situated between each set of two paired contact cylinders 37 and 38 being very slightly sloped with respect to the vertical. One achieves in this way contacts with the strip 26 by cylindrical surfaces of the contact cylinder of each pair 37 and 38 thereby substantially reducing the contact resistance. In addition, these surface contacts are provided immediately and completely as soon as the strip 26 is tightened, be it even very slightly. The braking action caused by the gliding of the strip on the surface of the cylinders 37 and 38 is negligible. In addition, the current passing through each surface contact of cylinders 37 and 38 is halved so that the energy lost at this level is reduced by that amount.

The contact cylinders 37 and 38 are cooled by water circulation therethrough in any suitable way and this cooling efficiently extends by thermal conductivity to the contact electrodes (not shown) supplying the current to them from secondary 39 and which may be formed, for example, by thick red copper angle irons (not shown) against the inside walls of which the cylinders 37 and 38 are braced.

The moving strip enters the upper section of the muffle 33 through the narrow slot 35 defined by two suitably spaced plates 43, for instance, of graphite.

The muffle 33 is filled with a protective, preferably slightly reducing inert gas suitably made up of a mixture of nitrogen having a 10% hydrogen content, discharged under pressure from connection pipes 44 which enter the lower section of the muffle 33 in proximity to the lower contact cylinders 38. The gas inlet is preferably to be divided into two by providing two branch connection pipes 45 and 46 having outlets arranged symmetrically and perpendicularly to opposite sides of the strip 26.

Upon leaving the muffle 33 at its bottom through the narrow outlet slot 36, the descending now sintered strip enters a cooling jacket 47 in which its temperature is lowered to a level compatible with its entrance into the open atmosphere.

The cooled sintered strip leaves the jacket 47 by passing through a narrow slot 48 defined either by revolving cylinders (not shown) or by a split sheet 49 made of rubber material. It is then wound up on a driven reel 50 driven as by means (not shown) having a speed of rotation equal to that of the live drum 27.

The various elements over which the strip 26 passes, that is, the feed and winding drums 20 and 50, the ribbed cylinders 25, the live drum 27 and the contact cylinders 37 and 38 are, of course, suitably insulated.

Apparatus and processes for coating of the strip 1 of FIGURE 1 or the strip 26 of FIGURE 2 and for drying the coatings in the alternative for the coating and drying arrangement of FIGURE 2 will now be described, particularly with reference to FIGURES 3 to 7 inclusive.

Figure 3:
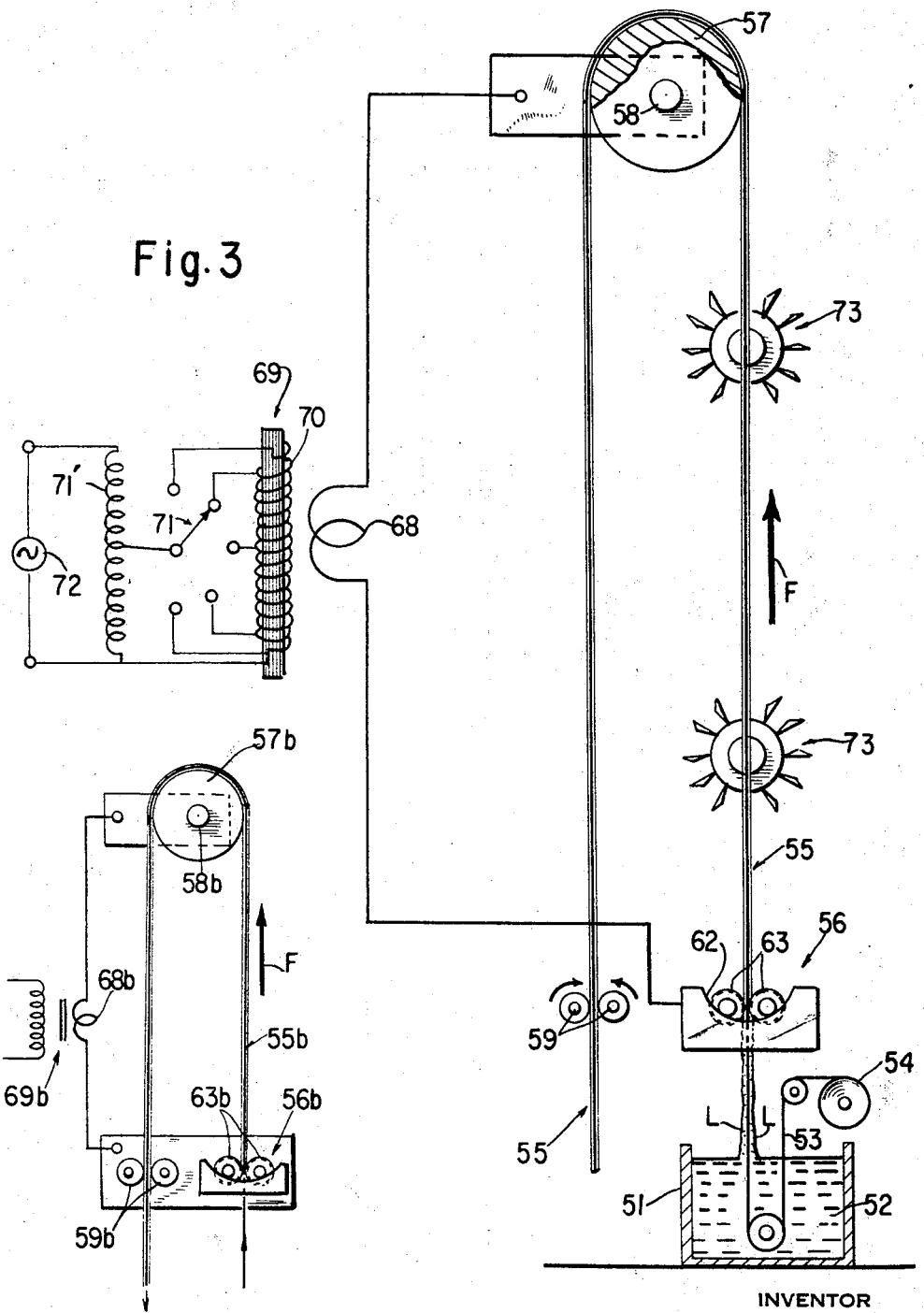
FIGURE 3 is a schematic view of an apparatus for coating of the foil and drying the coating on the foil in accordance with the present invention.

In installation illustrated in FIGURE 3, 51 comprises a vessel containing the coating product 52 for the foil 53 coming from a feed spool 54. This foil 53 dips into the coating product within the vessel. This coating product may be the suspension in water of nickel powder manufactured from nickel carbonyl with a small amount of an adhesive or thickener. Upon leaving the vessel 52, the foil 53 is coated on both sides with adhesive layers L of superabundant thickness. The strip 55 (foil 53 plus coating layers L) coated in this manner then passes through a layer thickness adjusting device 56 for the adjustment or uniformisation of the thicknesses of the layers L, the coated strip 56 then passes over a reversing pulley or drum 57, whose axis can be seen at 58 and which separates the strip into an ascending portion and into a descending portion, the movement of the strip being provided by the drive pulleys 59 through which its descending portion passes.

The thickness adjusting device 56 was described in the above-mentioned co-pending patent application, Serial No. 140,796. By way of recapitulation, it comprises (see also FIGURES 4 and 5) a cradle formed by two end plates 60—60 facing each other and joined by the cross-bars 61. The end plates 60 are shaped so as each to exhibit an upwardly directed, semi-circular concave upper profile 62. Two heavy cylinders 63—63 provided at their end-points with teat-screws 64 rest on the cradle, the said teat-screws resting on the incurved or concave surface 62 of the plates 60. These cylinders 63 are equipped with a series of fine ribs 65 having a circular shape and a constant height and being situated perpendicular to their axes, the latter being themselves perpendicular to the running direction F of the strip 26 passing between the cylinders 12.

By gravity, due to their own weight, the cylinders 63 normally gravitate to the lower section of the semi-circular ramps or profiles 62 and, with the outer edges of their ribs 64, powerfully come to rest against opposite sides of the metallic strip 53 with the ribs 64 passing easily through the pasty material layers L adhering to this strip. In this way, there is provided a play 66 between the opposite surfaces of the foil 53 and the surfaces of cylinders 63 and this play has a constant width equal to the height of the ribs 65.

The passage of the strip 55 between the ribbed cylinders 63 results in the elimination of any excess thickness of the pasty material and in the equalizing of the layers L of the latter to a thickness corresponding to the elevation of the ribs 65.

It is to be noted that, upon leaving the equalizing device 56, the pasty layers L adhering to the strip 53 do not retain the traces of the ribs 65 since the residual pasty material layers L on strip 53 closes down over the tracks of ribs 65, i.e. smooths out as soon as they leave the ribs 65.

In accordance with the present invention, the layer thickness adjusting device 56 is used also as one terminal for electric drying current supply to the strip 53, the various components of this device 56 being made of a conductive metal (e.g. copper or brass) a connecting post 67 being provided on the cradle and being connected to one end of the secondary 68 of a transformer 69 whose other end is connected elsewhere to the axis 58 of the pulley 67 which likewise is made of conductive metal.

The type of transformer especially suited for the special drying operations that is the object of this aspect of the invention is one conventionally used currently in electric welding technique. These transformers do indeed make is possible to generate considerable currents between the electrodes of welding machines, currents that are often in the range of thousands of amperes at one or two volts only, derived from a 220 volt, 50 cycle monophase source.

Within the framework of the invention, the amperages required are more modest but, by way of compensation, must be applied at a steady rate, for instance, for several hours. The windings of the transformer selected must be computed so as to prevent excess heating during 100% service. The secondary 68 comprises only one, two or three turns formed by wide, thin red copper strips piled on top of one another and wrapped in insulation such as a nylon fabric.

The connections of the secondary to the two contacts selected for the strip to be dried must be the shortest possible ones, in order to avoid substantial voltage drops. To achieve this condition, it is best to place the transformer on the machine between the two contact terminals 56 and 57 of the moving strip.

To come back to the characteristics of the electric energy to be applied to the strip to be dried, it is in the range of a few hundreds of amperes at a few volts only (for strips that are 2 meters long, from 0.06 to 0.18 meter wide and have a thickness from 0.1 to 0.05 millimeter). This very low level of the selected voltage is conditioned, on the one hand, above all by the amperages that must be applied to the metallic strips used and which are necessarily heating and, on the other, by the imperative obligations with regard to the safety of the personnel that has to handle the conductive substances in suspension in water in the presence of conductors under load, without any danger of electrocution.

The current passing through the ascending section of coated strip 55 between the ribbed cylinder device 56 and the reversing pulley 57 generates by joulean effect heat units within the very interior of the coated strip and provides for very efficient drying of the latter.

The electric control of the heating of the coated strip is provided, on the one hand, by the pre-setting of the primary 70 of the low voltage autotransformer 69 having multiple central tappings connected to a fixed contact switch 71 and, on the other, by a precise, continuous adjustment by means of an autotransformer coil 21 placed between the power source 72 and the primary 70 of the low-voltage transformer 18.

Tests conducted by me point to the usefulness of moderate ventilation of the strip 55 during the drying process.

Indeed, the internal heating of the moist strip results in generating almost immediately a water-vapor saturated air cover on the level of the surface coated with nickel powder paste. Once this water-vapor cushion has formed, it resists any new evaporation. It consequently appears to be necessary to circulate the layers of air that surround the strip.

This result can be very easily brought about, for instance, through a light blowing caused by one or several blowers 73 arranged so that the flow of air produced circulates parallel to the surface of the hot strip.

The effect of the air current is surprising and considerably accelerates the drying speed of the nickel-powder layer, contrary to the result achieved, for instance, with forced air circulation in a drier equipped with infra-red lamps.

This spectacular difference can be explained by the fact that the forced air circulation in a conventional drier cuts the flow of heat in the direction of the article to be dried and carries it in to a different direction toward the outside. On the contrary, in the event of an article that is self-heating in its very body, the slight displacement of ambient air has as an advantageous result not the cooling but only the removal of the layer of saturated steam which surrounds it and which arrests the process of evaporation of the water contained.

Although, in the embodiment just described, use is made, in order to establish electric contact with the metallic support strip 55 of ribbed cylinders 63 of the thickness equalizing device 56 of the pasty layer, it is quite obvious that the two functions can be separated by using sets of different cylinders, one for the equalizing of the thickness and another one for the conduction of the current. In the latter case, it is, of course, indicated that the ribs of the second device, have a height greater than the desired thickness of the paste so as not to affect this thickness. In order to regulate the thickness, it is also possible to use a device other than that forming the object of the above-mentioned patent application, for instance, a device provided with strips.

Of course, the only problem that arises in order to establish the electric circuit is that of the contact with the metallic support strip 53 at the point where it is coated with layers in the pasty state; in point of fact, when the coated strip is dry or almost dry, the coating becomes conductive and it is easy to establish any kind of contact on the surface of the latter, for forming the second current feed terminal.

Figure 6:
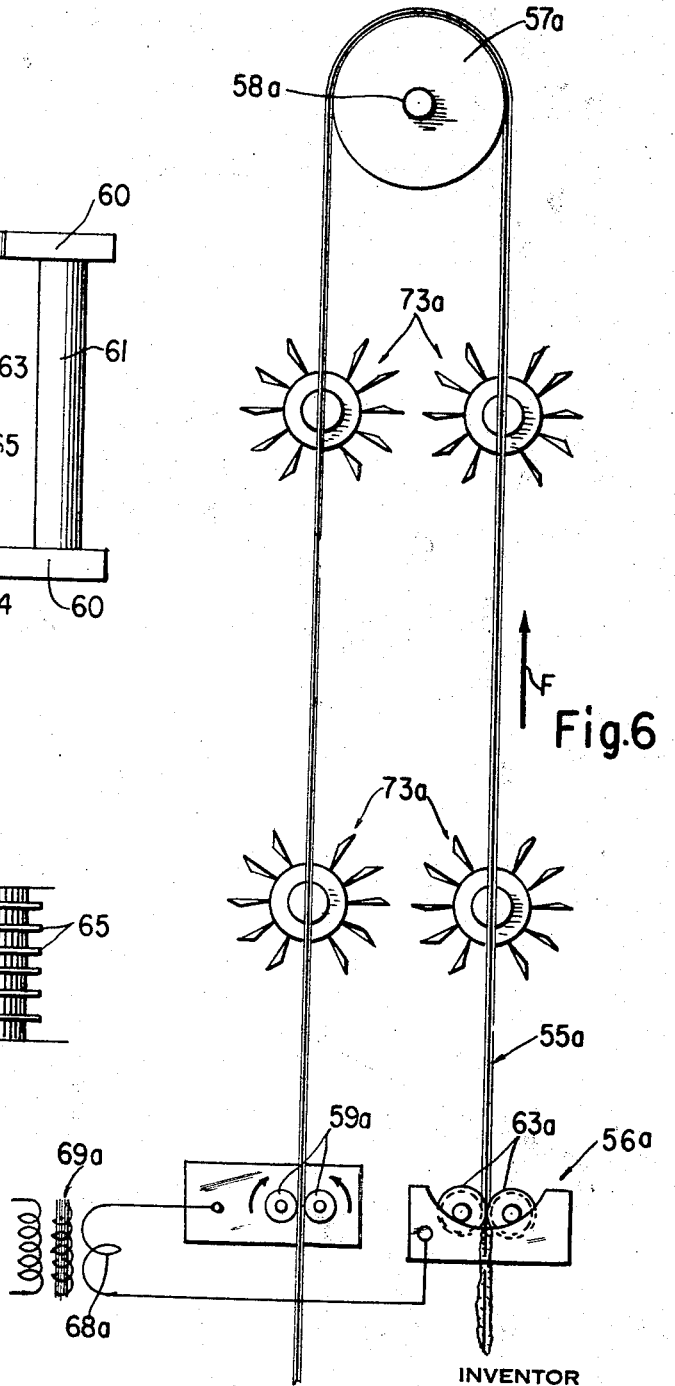
FIGURE 6 is a schematic variant of FIGURE 4.

In the embodiment shown in FIGURE 3, this second terminal is the reversing pulley 57, but one could just as well have relied on the use of special contact rollers or even on strip drive rollers 59a—59a, as shown in FIGURE 6. In the embodiment of FIGURE 6, all parts having similar reference characters as those in FIGURES 3, 4 and 5 with the added subscript $a$ are identical.

In this variant of the embodiment drying of the strip 55a occurs in the descending portion thereof, between the pulley 57a and the contact rollers 59a where the strip 55a arrives completely dry. It should be noted in this connection that the resistivity of the coated strip decreases gradually as it dries and that, consequently, the current being equal over the entire length, the amount of heat generated by joulean effect at any given point will be greater the wetter the coating is.

It will, of course, be necessary that the contact rollers 59a should be of conductive material and contact could be improved by roughening their surface somewhat through a prior sand-blasting operation.

This contact may nevertheless prove to be insufficient in view of the amperages that are involved, for one could never, without causing damage, exert excessive pressure on the coated strip at the level of the contact rollers 59a. Under these circumstances, the variant shown in FIGURE 7 wherein all parts in FIGURE 7 having similar reference characters to those of FIGURES 3–5 with the added subscript $b$ are identical, may appear to be more advantageous since the voltage is applied between the pulley 57b on the one hand and the ribbed cylinders 63b and the rollers 59b on the other, the ascending and the descending portions of the strip 55b being then in parallel.

While specific embodiments of the invention have been described, variations in detail within the scope of the appended claims are possible and are contemplated. There is no intention, therefore, of limitation to the exact disclosure herein made.

What is claimed is:

1. In the process of sintering a coating to a metal strip of material, the steps of applying a wet coating of sinterable material to said strip, regulating the thickness of the applied coating by passage of the coating bearing strip between ribbed rollers whose ribs penetrate the coating and make direct electrical contact with said strip, moving the coated strip along a path having an ascending portion and a descending portion by passage around a conductive reversing drum, drying the wet coating onto the strip in said ascending portion by the passage of an electric current therethrough of amperages sufficient to dry the wet coating utilizing the ribs and drum to establish electrical contact with the strip and its coating, blowing drying gas across the said ascending portion of the strip during its drying by said electric current, sintering the dried coating to the strip in its descending portion by passage through a selected length thereof of a second electric current of amperage sufficient to raise said length to the sintering temperature of said coating, surrounding said length with a protective atmosphere and thereafter cooling said sintered strip.

2. Apparatus for sintering a coating of sinterable material to a strip comprising means including an electrically conductive reversing drum for guiding and moving the strip along a path having an ascending portion and a descending portion, means for applying a wet coating of said sinterable material to said strip in said ascending portion, electrically conductive roller means having ribs for regulating the thickness of the wet coating on said strip in its ascending portion and penetrating the coating into electrical contact with said strip, means for passing an electric current through a selected length of said strip via said ribs and reversing drum in its ascending portion of an intensity sufficient in order by joulean effect to generate therein heat required to dry the coating on said strip, means for passing a second electric current through a second selected length of said strip in its descending portion of an intensity sufficient in order by joulean effect to generate therein heat required to sinter the dried coating on said strip, and means for providing a protective gaseous atmosphere to the strip at least in the length thereof being traversed by said second electric current.

3. Apparatus as per claim 2 wherein said means for passing said second electric current through a second selected length of said strip in its descending portion includes a pair of spaced-apart sets of rollers, with the rollers of each pair arranged so as to impart bending to the strip in opposite directions in its passage therebetween to improve electric surface contact between the rollers and said strip.

4. Apparatus according to claim 2 wherein said means for providing a protective gaseous atmosphere to the strip comprises a muffle device through which said second length of said strip passes longitudinally and means for introducing a protective gas into said muffle so as to flow the latter upwardly about the said second length of said strip during descending motion thereof in said muffle device.

5. Apparatus according to claim 2 wherein said means for providing a protective gaseous atmosphere to said strip comprises a muffle device of light refractory material surrounding said second length of said strip, and means for introducing a protective gaseous mixture of nitrogen and 10% hydrogen under atmospheric overpressure into said muffle device to flow upwardly therethrough around said downwardly descending second length of said strip.

6. Apparatus according to claim 2 wherein said means for providing a protective gaseous atmosphere to said strip comprises a muffle device of light refractory material surrounding said second length of said strip and cooling means beyond said muffle device through which said strip passes after leaving said muffle device.

7. Apparatus for sintering a coating of sinterable material to a strip comprising means including an electrically conductive reversing drum for guiding and moving the strip along a path having an ascending portion and a descending portion, means for applying a wet coating of said sinterable material onto said strip in its ascending portion, electrically conductive roller means having ribs for regulating the thickness of the wet coating on said strip in its ascending portion and penetrating the coating into electrical contact with said strip, means for passing an electric current through a selected length of said strip via said ribs and reversing drum in its ascending portion of an intensity sufficient in order by joulean effect to generate therein heat required to dry the coating on said strip, means for ventilating the strip in said length to eliminate moisture saturated air layers that form along the surface of said strip during passage of said electric current, means for passing a second electric current through a second selected length of said strip having dried coating thereon in its descending portion of an intensity sufficient by joulean effect to generate therein heat required to sinter the dried coating on said strip, means surrounding the second length of said strip for providing a protective gaseous atmosphere to said second length of said strip being traversed by said second electric current and means for cooling the said strip leaving sintered coating thereon after sintering has been effected by said second electric current.

References Cited by the Examiner

UNITED STATES PATENTS

| | | | |
|---|---|---|---|
| 1,606,393 | 11/26 | Apple | 117—93 X |
| 1,822,385 | 9/31 | Watson | 118—620 |
| 1,822,484 | 9/31 | Hartsough | 118—620 X |
| 1,899,016 | 2/33 | Darby | 117—93 |
| 1,922,254 | 8/33 | McCulloch | 117—22 X |
| 2,216,519 | 10/40 | Quarnstrom | 118—260 X |
| 2,290,338 | 7/42 | Koehring | 117—22 |
| 2,372,118 | 3/45 | Radcliffe | 118—620 |
| 2,434,169 | 1/48 | Larsen | 118—67 X |
| 2,719,355 | 10/55 | Diffenderfer | 117—230 |
| 2,823,641 | 2/58 | Cook et al. | 118—117 X |
| 2,950,215 | 8/60 | Slater et al. | 117—114 |
| 2,977,243 | 3/61 | Meier | 118—117 X |
| 3,010,844 | 11/61 | Klein et al. | 118—67 |
| 3,058,840 | 10/62 | Kerr et al. | 118—620 |

FOREIGN PATENTS 92    1908    Great Britain.

WILLIAM D. MARTIN, *Primary Examiner.*

UNITED STATES PATENT OFFICE
CERTIFICATE OF CORRECTION

Patent No. 3,203,831                                        August 31, 1965

Robert Achille Antoine Jeannin

It is hereby certified that error appears in the above numbered patent requiring correction and that the said Letters Patent should read as corrected below.

Column 3, line 6, for "5/100 and 10/1000" read -- 5/100 and 10/100 --; column 8, line 44, for "is" read -- it --.

Signed and sealed this 22nd day of February 1966.

(SEAL)
Attest:

ERNEST W. SWIDER                                  EDWARD J. BRENNER
Attesting Officer                                          Commissioner of Patents